United States Patent [19]
Quantz et al.

[11] 3,912,939
[45] Oct. 14, 1975

[54] METHOD AND APPARATUS FOR DETECTING THE OCCUPANCY OF A VEHICLE SEAT

[75] Inventors: Norman G. Quantz, Algonac; Chen Yi Lee, Troy, both of Mich.

[73] Assignee: Lectron Products, Inc., Troy, Mich.

[22] Filed: Apr. 1, 1974

[21] Appl. No.: 456,679

[52] U.S. Cl. ......... 307/10 SB; 180/82 C; 340/52 E; 340/258 C
[51] Int. Cl.²......................................... B62D 45/00
[58] Field of Search ..... 180/82 C; 340/52 E, 258 C, 340/278; 317/DIG. 2; 307/10 SB; 280/150 SB

[56] References Cited
UNITED STATES PATENTS
3,806,867   4/1974   Quantz............................. 340/52 E Primary Examiner—Herman Hohauser
Attorney, Agent, or Firm—Harness, Dickey & Pierce

[57] ABSTRACT

A seat occupant seat detector for a safety belt interlock/warning system including a square wave generator, a reference capacitor which is connected to receive the square wave, a large area conductor positioned in the seat bottom which is connected to receive the square wave, and a logic circuit responsive to the relative capacitance of the reference capacitor and the seat conductor comprising a pair of NAND gates connected to the capacitor and the seat conductor and arranged to provide an output signal in response to the relative rise time of the square wave at the capacitor and at the seat conductor.

27 Claims, 3 Drawing Figures

METHOD AND APPARATUS FOR DETECTING THE OCCUPANCY OF A VEHICLE SEAT

BACKGROUND AND SUMMARY OF THE INVENTION

The present invention relates to a method and apparatus for detecting the occupancy of a seat which is particularly useful for detecting the occupancy of a seat of a vehicle for a safety belt interlock/warning system.

The present invention relates generally to the type of seat occupancy sensor disclosed in co-applicant Norman G. Quantz's co-pending applications Ser. No. 150,088, filed June 4, 1971, entitled "Method And Apparatus For Detecting the Utilization of a Vehicle Safety Belt" and Ser. No. 414,867, filed Nov. 12, 1973, entitled "Method and Apparatus For Detecting the Utilization of a Vehicle Safety Belt," in that it uses a conductor in the seat which is positioned to be closely adjacent the occupant when the seat is occupied so that its capacitance is affected by the proximity of the occupant. Preferably, the conductor is a large area conductor such as conductive foil or a conductive wire mesh.

In accordance with the present invention, the change in capacitance of the conductor which is associated with the seat is detected by comparison with the capacitance of a reference capacitor. Preferably, the capacitance of the reference capacitor is selected to be intermediate the value of capacitance of the seat conductor prior to occupancy of the seat and the value of the capacitance of the seat conductor after occupancy of the seat. An oscillator, preferably a square wave generator such as a multivibrator, is connected to both the seat conductor and the reference capacitor so that the waveform at each will be altered by the value of capacitance of each. A relative capacitance responsive circuit is connected to the seat conductor and the reference capacitor to compare the capacitance of each so that the occupancy of the seat can be detected. In its preferred form, the relative capacitance responsive circuit compares the wave shape of the wave at the reference capacitor and at the seat conductor and responds to the alteration in the shape of the wave at the seat conductor which occurs when the seat is occupied. For example, the capacitive responsive means may compare the rate of decay or rise of the wave at the reference capacitor and at the seat conductor to detect the change in capacitance at the seat conductor. In the preferred embodiment which is disclosed, a pair of NAND gates compare the rise time of the square wave at the reference capacitor and at the seat conductor and has a switched output depending upon whether the rate of rise of the square wave at the seat conductor is greater or lesser than the rate of rise of the square wave at the reference capacitor.

DETAILED DESCRIPTION OF THE PREFERRED EMBODIMENTS

Figure 1:
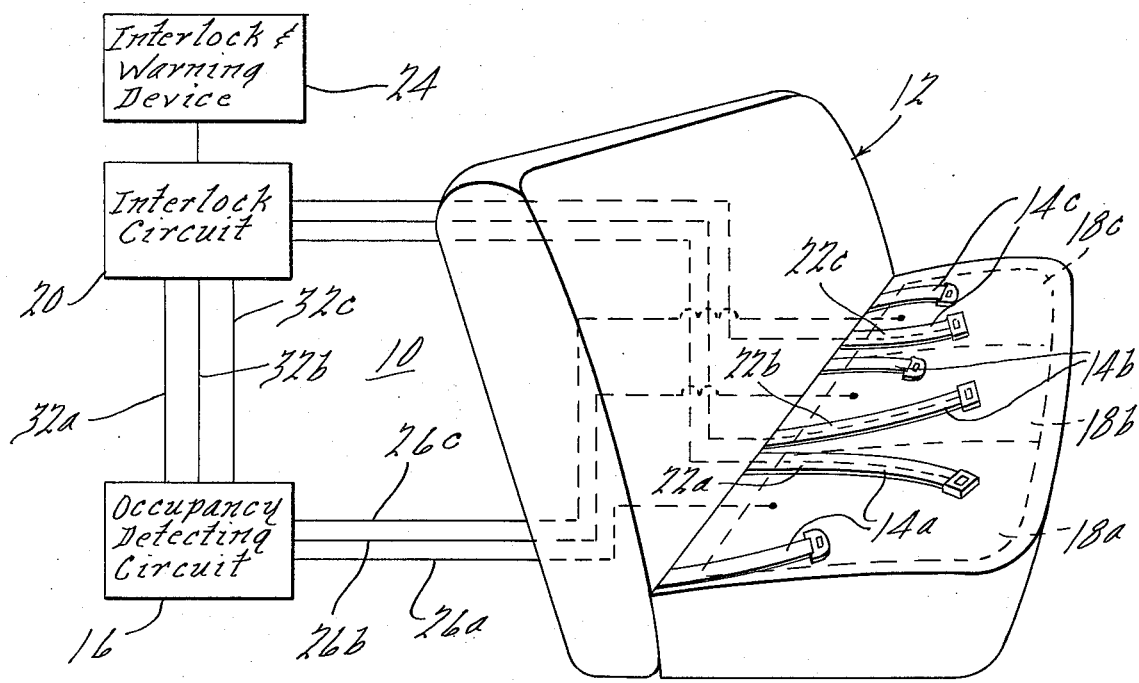
FIG. 1 is a block diagram of a seat occupancy detector of the present invention shown in conjunction with a vehicle seat, an interlock circuit, and lap-type safety belts.

In FIG. 1, a safety belt interlock system 10 is illustrated in conjunction with a seat 12 of a motor vehicle. The interlock system 10 detects the occupancy of the seat 12 and the utilization of the safety belts 14a–14c. The interlock system 10 generally comprises a seat occupancy detecting circuit 16 which is associated with seat conductors 18a–18c, an interlock circuit 20 which is associated with safety belt conductors 22a–22c (only one of two for each safety belt being shown), and an interlock and warning device 24. Preferably, the seat conductors 18a–18c are large area foils with each being positioned close to the upper surface of the bottom portion of the seat 12 and being located beneath respective ones of three seating positions on the seat 12. Upon occupancy of one of the seating positions, as detected by the occupancy detecting circuit 16, with the respective one of the safety belts 14a–14c being unbuckled as detected by the interlock circuit 20, the interlock and warning device 24 prevents the operation of the vehicle by disabling the ignition or the transmission and provides a suitable warning signal such as a light or an audible noise. Upon buckling of the respective seat belt 14a–14c, as detected by the interlock circuit 20, the vehicle can be operated and the warning is terminated.

Figure 2:
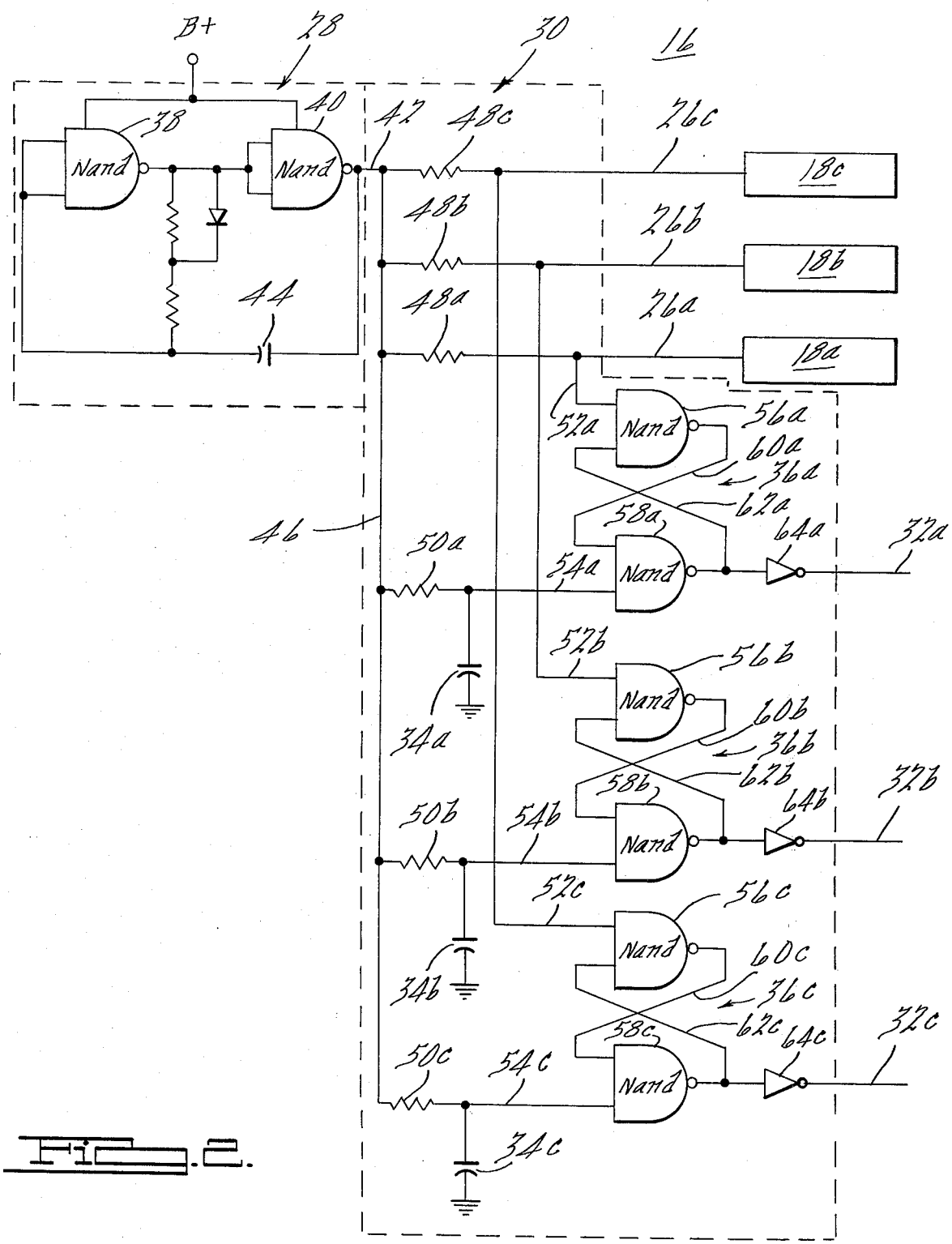
FIG. 2 is a circuit diagram of the seat occupancy detector of the present invention.

In FIG. 2 the occupancy detecting circuit 16 is shown as connected to seat conductors 18a–18c by conductors 26a–26c. The occupancy detecting circuit 16 essentially comprises an oscillator 28 and a capacitance responsive circuit 30. The capacitance responsive circuit 30 provides an output signal on lines 32a–32c whenever any one of the three seating positions of the seat 12 is occupied. The capacitance responsive circuit 30 includes reference capacitors 34a–34c with which the capacitance of seat conductors 18a–18c, respectively, will be compared and capacitance comparison circuits 36a–36c for comparing the capacitance of capacitors 34a–34c with the capacitance of seat conductors 18a–18c, respectively.

The capacitance comparison circuits 38a–38c are each connected to lines 32a–32c, respectively, so that an output signal is provided on the respective one of lines 32a–32c if any one of the capacitance comparators 36a–36c detects an increase in capacitance at its respective seat conductors 18a–18c.

The oscillator 26 is preferably an astable multivibrator comprising two NAND gates 38 and 40 which provide a repetitive square wave output on line 42 to the capacitance responsive circuit 30. It should be noted that both inputs to the NAND gates 38 and 40 are connected in common so that the NAND gates operate in a manner similar to a low-gain operational amplifier. Operational amplifiers may be readily substituted for the NAND gates 38 and 40. However, for manufacturing convenience and cost considerations, NAND gates have been used since the remaining integrated circuits in the occupancy detecting circuit 16 are NAND gates of the same type.

The astable multivibrator 28 is of common configuration with a direct connection between the output of NAND gate 38 and the input of NAND gate 40 and a feedback connection between the output of NAND gate 40 and the input of NAND gate 38 through a feedback capacitor 44, so that when one NAND gate provides "one" output, the other NAND gate provides a "zero" output, and vice versa, so that a square wave is generated at line 42. A more particular description of this circuit may be found on page 112 of the RCA COS/MOS Integrated Circuits Manual, Technical Series CMS-270, RCA Corporation, 1971. It will be appreciated that other square wave generators may be used in place of the particular oscillator 28 disclosed herein.

The square wave output on line 42 is received by a bus line 46 of the capacitance responsive circuit 30 which supplies the square wave from the oscillator 28 to seat conductors 18a–18c through resistors 48a–48c, respectively, and to reference capacitors 34a–34c through resistors 50a–50c, respectively. Accordingly, the square wave on line 42 is received by each of the seat conductors 18a–18c and the reference capacitors 34a–34c so that the capacitance thereof will influence or alter the shape or configuration of the time varying wave from the oscillator 28. The seat conductors 18a–18c and the reference capacitors 34a–34c are electrically isolated in part by resistors 48a–48c and 50a–50c.

The operation of the device will only be specifically described with respect to seat conductor 18a, reference capacitor 34a, and the relative capacitance comparator 36a, although it will be understood that the correspondingly numbered components operate in the same manner and need not be additionally described. Capacitance comparator circuit 36a is connected to seat conductor 18a by line 52a and to reference capacitor 34a by line 54a. The capacitance comparator circuit 36a includes a NAND gate 56a and a NAND gate 58a with the NAND gate 56a being connected to the conductor 52a for receiving the waveform at the seat conductor 18a at one of its input terminals and the NAND gate 58a being connected to the conductor 54a for receiving the waveform at the reference capacitor 34a at one of its input terminals. The output of NAND gate 56a is connected to the other input of NAND gate 58a by a line 60a while the output of NAND gate 58a is connected to the other input terminal of the NAND gate 56a by a line 62a. The output of NAND gate 58a is also connected to an inverting amplifier 64a which provides its inverted output on line 32a to indicate the occupancy of the seat position corresponding to seat conductor 18a.

Figure 3:
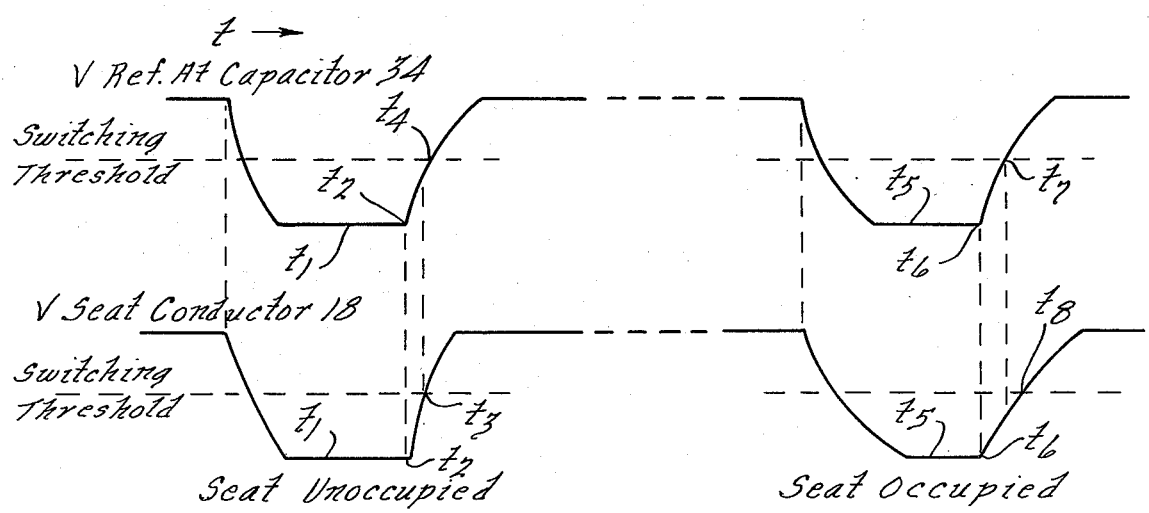
FIG. 3 is a diagram of the waveforms of the reference capacitor and the seat conductor as provided and detected by the seat occupancy detector of FIG. 2.

The operation of the occupancy detecting circuit 16a will be considered with reference to the signal diagrams of FIG. 3. Note that in FIG. 3, a switching threshold level for the NAND gates 56a–56c and 58a–58c is illustrated. When the seat 12 is unoccupied, the capacitance of the seat conductor 18a has a predetermined first value. This value is selected to be less than the value of the associated reference capacitor 34a. Consequently, the rate of rise and decay of the wave from oscillator 28 will be greater at the conductor 18a than at the corresponding reference capacitor 34a. The configuration of the square wave at the reference capacitor 34a and the seat conductor 18a is illustrated in FIG. 3 with the leftward waveform being appropriate for an unoccupied seat position.

The capacitance comparator circuit 36a–36c utilizes the positive-going or increasing portion of the wave for determining the relative capacitance of the seat conductor 18a and reference capacitor 34a. Looking at the leftward waveform for the unoccupied seat, the waveform at the seat conductor 18a is seen to reach the switching threshold at an earlier point in time than the waveform at the reference capacitor 34a.

Looking now to the circuit diagram of the relative capacitance comparator 36a in FIG. 2, it will be appreciated that the signals on line 52a and the signals on line 54a will each be in a low potential condition, i.e. at logic "zero" at time t1 prior to the rise in the waveform at the seat conductor 18a and the reference capacitor 34a. The NAND gates 56a and 58a operate so that if the input to either is at the low or "zero" potential, the output of the NAND gate will be at the high potential, i.e. a logic "one." Consequently, prior to the rise in the waveform at the conductor 18a and the reference capacitor 34a the output of each NAND gate 56a and 58a on lines 60a and 62a will be high. Since the output of each NAND gate 56a and 58a is connected to the other input of the other NAND gate 56a and 58a by lines 60a and 62a, each NAND gate 56a and 58a will also be receiving one high potential at its input terminals. At time t2 the waveform at the conductor 18a and the reference capacitor 34a begins to increase, with the rate of increase being greater for the conductor 18a since its value of capacitance is less than the value of capacitance of capacitor 34a. Therefore, the waveform at conductor 18a achieves the switching threshold at time t3 which is in advance of the time t4 at which the waveform at the reference capacitor 34a reaches the switching threshold. Accprdingly, the NAND gate 56a will receive a high potential on line 52a which, in concert with the high potential at its other input from NAND gate 58a on line 62a, causes the output of NAND gate 56a on line 60a to go low. Since the output of NAND gate 56a on line 60a is provided to the other input terminal of the NAND gate 58a, and that signal goes low at time t3, the output of NAND gate 50a will not go low at time t4 when the output on line 54a goes high. Accordingly, the output of NAND gate 58a remains high. This output is inverted by inverter 64a so that a low potential, e.g. a logic "zero," is provided to line 32. The logic "zero" indicates that no one is occupying the seat corresponding to conductor 18a.

Presuming now that the seat 18a becomes occupied, the capacitance associated with the conductor 18a will substantially increase because of the difference in the dielectric constant of the human body which is interposed between the conductor 18a and the chassis of the vehicle. This increase in capacitance will modify the shape of the square wave at the conductor 18a so that its decay and rise time will be reduced as represented in the rightward portion of the signal represented in FIG. 3. This change in waveform is detected by the capacitance comparison circuit 36a as follows: At time t5 the inputs on lines 52a and 54a are again low so that the outputs of NAND gates 56a and 58a are high. The waveform at the seat conductor 18a and the capacitor 34a begins to increase at time t6. In the case of the occupied seat, however, the waveform at the reference capacitor 34a reaches the switching threshold at time t7 in advance of the time t8 that the waveform at the conductor 18a reaches the switching level. Consequently, the signal on line 54a goes high at time t7 so that the NAND gate 58a receives two high inputs to result in a low input at its output. This low input is provided to the other input terminal of NAND gate 56a at time t7 via line 62a. Therefore, at time t8, the NAND gate 56a is already receiving a low input so that its output will remain high when the signal on line 52a goes high. The low output from NAND gate 58a is inverted by the inverter 64a to provide a high output, e.g. a logic "one," on line 32 to indicate that the seat is occupied. The signal on line 32a is received by the interlock circuit 20 which prevents operation of the vehicle and provides a warning until the associated safety belt 14a is buckled.

Although the seat occupancy detecting circuit 16 has been described as comparing the rate of rise of the square wave of the oscillator 28, it will be appreciated that the circuit may be readily modified to compare the rate of decay of the square wave of the oscillator 28. Additionally, it will be appreciated that each of the NAND gates 56a and 58a act as threshold devices and that each has provision for being inhibited by the other if the other NAND gate first receives a signal which attains its threshold value.

In view of the above description of the preferred embodiment of the present invention, it can be seen that a relatively straightforward solid-state system is provided for detecting the occupancy of a vehicle seat. It should be noted that the system utilizes inexpensive and reliable digital integrated circuits. Importantly, these digital circuits are adapted in accordance with the principles of the present invention to function in a quasi-analog mode in that they compare the capacitance of two capacitors, a function normally reserved for analog devices.

It is to be understood that the foregoing description is that of preferred embodiments of the invention. Various changes and modifications may be made without departing from the spirit and scope of the invention as defined by the appended claims.

What is claimed is:

1. An apparatus for detecting the occupancy of a seat or the like by an occupant comprising:
    generating means for providing a time varying signal;
    reference capacitor means having a reference value of capacitance and operatively connected to said generating means to receive said signal;
    conductor means also operatively connected to said generating means to receive said signal and mountable in association with said seat so as to be in a position in the vicinity of said occupant, said conductor means being adapted to have a first value of capacitance when said seat is unoccupied and a second value of capacitance when said occupant occupies said seat; and
    detecting means operatively connected with said reference capacitor and said conductor means for detecting the change of the value of capacitance of said conductor means from said first value of capacitance to said second value of capacitance by responding to the relative capacitance of said reference capacitor means and said conductor means to provide a signal representative of said occupancy.

2. An apparatus according to claim 1 wherein said generating means provides a time varying signal having a predetermined wave shape which is altered by the value of capacitance of said reference capacitor means to provide a reference altered signal and is altered by the value of capacitance of said conductor means to provide an occupant altered signal and wherein said detecting means receives said reference altered signal and said occupant altered signal and detects the relative capacitance of said reference capacitor means and said conductor means by responding to the shape of the reference and occupant altered signals.

3. An apparatus according to claim 1 wherein said generating means is an oscillator which provides a repetitive signal.

4. An apparatus according to claim 1 wherein said generating means provides a square wave.

5. An apparatus according to claim 2 wherein said detecting means compares the rise or decay of said reference and occupant altered signals.

6. An apparatus according to claim 5 wherein said detecting means compares the rate of rise or decay of said reference and occupant altered signals.

7. An apparatus according to claim 5 wherein said detecting means includes threshold means for receiving said reference and occupant altered signals for responding to the time at which said reference and occupant altered signals attain a predetermined threshold value.

8. An apparatus according to claim 7 wherein said threshold means includes a logic circuit which responds to the attainment of said threshold by providing an output signal which changes from a first condition to a second condition upon the attainment of said threshold.

9. An apparatus according to claim 7 wherein said threshold means includes a pair of threshold devices with one of said threshold devices receiving said reference altered signal and the other of said threshold devices receiving said occupant altered signal for determining which of the reference and occupant altered signals first attains a predetermined threshold value.

10. An apparatus according to claim 9 wherein said detecting means includes means for inhibiting one of said pair of threshold devices when the altered signal received by the other of said pair of threshold devices first attains said predetermined threshold value.

11. An apparatus according to claim 10 wherein each of said pair of threshold devices has an output terminal for providing a predetermined output signal upon attainment of said threshold value by its respective one of said altered signals, the output terminal of one of said threshold devices being connected to the other threshold device to inhibit said other threshold device from providing its predetermined output signal when the one threshold device has provided its predetermined output signal.

12. An apparatus according to claim 11 wherein each of said threshold devices is a logic circuit having said output terminal for providing an output signal having two logic states with one of said logic states representing said predetermined output signal.

13. An apparatus according to claim 12 wherein said logic device is a NAND gate.

14. An apparatus for detecting the occupancy of a seat or the like by an occupant comprising:
    oscillator means for providing a repetitive time varying signal having a predetermined wave shape;
    reference capacitor means receiving said signal for altering the wave shape of said signal in accordance with the value of capacitance of said reference capacitor means to provide a reference altered signal;
    conductor means receiving said signal which is mountable in association with said seat so as to be in a position in the vicinity of said occupant when said occupant occupies said seat so that the value of capacitance of said conductor will be changed by said occupancy, said conductor means altering the wave shape of said signal in accordance with the value of capacitance of said conductor for providing an occupant altered signal; and comparator means receiving said reference altered signal and said occupant altered signal for determining a change in the wave shape of said occupant altered signal relative to said reference altered signal upon the change in capacitance of said conductor means when said occupant occupies said seat to provide a signal representative of said occupancy.

15. An apparatus according to claim 14 wherein said oscillating means provides a square wave.

16. An apparatus according to claim 14 wherein said comparator means compares the rise or decay of said reference and occupant altered signals.

17. An apparatus according to claim 16 wherein said comparator means compares the rate of rise or decay of said reference and occupant altered signals.

18. An apparatus according to claim 17 wherein said comparator means compares the rate of rise of said reference and occupant altered signals.

19. An apparatus according to claim 16 wherein said comparator means includes a threshold means for receiving said reference and occupant altered signals for responding to the time at which said reference and occupant altered signals attain a predetermined threshold value.

20. An apparatus according to claim 19 wherein said comparator means includes a logic circuit which responds to the attainment of said threshold by providing an output signal which changes from a first condition to a second condition upon the attainment of said threshold.

21. An apparatus according to claim 20 wherein said threshold means includes a pair of threshold devices with one of said threshold devices receiving said reference altered signal and the other of said threshold devices receiving said occupant altered signal for determining which of the reference and occupant altered signals first attains a predetermined threshold value.

22. An apparatus according to claim 21 wherein said comparator means includes means for inhibiting one of said pair of threshold devices when said altered signals received by the other of said pair of threshold devices first attains said predetermined threshold value.

23. An apparatus according to claim 22 wherein each of said pair of threshold devices has an output terminal for providing a predetermined output signal upon attainment of said threshold value by its respective one of said altered signals, the output terminal of one of said threshold devices being connected to the other threshold device to inhibit said other threshold device from providing its predetermined output signal when the one threshold device has provided its predetermined output signal.

24. An apparatus according to claim 23 wherein each of said threshold devices is a logic circuit having said output terminal for providing an output signal having two logic states with one of said logic states representing said predetermined output signal.

25. An apparatus according to claim 24 wherein said logic device is a NAND gate.

26. An apparatus according to claim 14 wherein said reference capacitor means has a value of capacitive which is intermediate the value of capacitance of said conductor means before said occupancy and the value of capacitance of said conductor means after said occupancy.

27. A method for detecting the occupancy of a seat or the like by an occupant comprising the steps of:
supplying a time varying signal to a reference capacitor;
supplying a time varying signal to a conductor associated with the seat and positioned to be in the vicinity of said occupant when said occupant occupies said seat so that the value of capacitance of said conductor will be affected by said occupancy; and
comparing the value of capacitance of said reference capacitor with the value of capacitance of said conductor before and after said occupant occupies said seat to detect the change in the value of capacitance of said conductor relative to said reference capacitor when said occupant occupies said seat.

* * * * *